(12) United States Patent
Bernard et al.

(10) Patent No.: US 11,639,533 B2
(45) Date of Patent: May 2, 2023

(54) PEARL SUGAR; PROCESS FOR PREPARING PEARL SUGAR

(71) Applicant: TIENSE SUIKERRAFFINADERIJ N.V., Brussels (BE)

(72) Inventors: Joerg Bernard, Albsheim (DE); Tillmann Doerr, Hohen-Suelzen (DE); Eric Borgers, Kortenaken (BE); Johan De Soete, Kessel-Lo (BE); Didier Goffin, Orp-Jauche (BE)

(73) Assignee: TIENSE SUIKERRAFFINADERIJ N.V.

( * ) Notice: Subject to any disclaimer, the term of this patent is extended or adjusted under 35 U.S.C. 154(b) by 115 days.

(21) Appl. No.: 16/072,474

(22) PCT Filed: Feb. 6, 2017

(86) PCT No.: PCT/EP2017/000162
§ 371 (c)(1),
(2) Date: Jul. 24, 2018

(87) PCT Pub. No.: WO2017/133853
PCT Pub. Date: Aug. 10, 2017

(65) Prior Publication Data
US 2018/0371557 A1 Dec. 27, 2018

(30) Foreign Application Priority Data
Feb. 5, 2016 (EP) .................................. 16000287

(51) Int. Cl.
| C13B 50/00 | (2011.01) |
| C13B 40/00 | (2011.01) |
| A23P 10/25 | (2016.01) |
| A23P 10/20 | (2016.01) |
| A21D 2/18 | (2006.01) |

(52) U.S. Cl.
CPC ............ *C13B 50/004* (2013.01); *A21D 2/181* (2013.01); *A23P 10/20* (2016.08); *A23P 10/25* (2016.08); *C13B 40/007* (2013.01); *A23V 2002/00* (2013.01); *A23V 2250/62* (2013.01); *A23V 2250/628* (2013.01)

(58) Field of Classification Search
CPC ..... C13B 50/004; C13B 40/007; A23P 10/20; A23P 10/25
USPC ..................... 424/439; 426/285, 660; 127/60
See application file for complete search history.

(56) References Cited

U.S. PATENT DOCUMENTS

| 2,019,365 | A | * | 10/1935 | Speed | .................... A23G 3/32 |
| | | | | | 127/30 |
| 3,706,599 | A | * | 12/1972 | Woodruff | .............. C13B 30/028 |
| | | | | | 127/62 |
| 5,851,553 | A | * | 12/1998 | Myers | .................... A23G 3/10 |
| | | | | | 424/488 |
| 6,123,980 | A | * | 9/2000 | Pearson | ................ C13B 50/004 |
| | | | | | 127/63 |
| 6,764,706 | B1 | * | 7/2004 | Heikkila | ................ A23G 3/346 |
| | | | | | 426/3 |
| 2008/0292770 | A1 | * | 11/2008 | Shibata | .................... A23C 9/16 |
| | | | | | 426/588 |
| 2009/0017167 | A1 | * | 1/2009 | Krumhar | ................... A23L 2/52 |
| | | | | | 426/72 |
| 2014/0011892 | A1 | * | 1/2014 | Verkier | ................... A23P 10/20 |
| | | | | | 514/777 |

FOREIGN PATENT DOCUMENTS

| EP | 0554231 | | 8/1993 | ............... A21D 2/18 |
| EP | 2095724 | * | 2/2009 | |
| EP | 2100519 | A1 * | 9/2009 | ............. A23L 1/236 |
| EP | 2631304 | | 8/2013 | ............. C13B 40/00 |
| FR | 623344 | | 6/1927 | ............. C13B 50/02 |
| JP | 2005035880 | | 2/2005 | ............... C01D 7/07 |

OTHER PUBLICATIONS

Beals, Sizes of Organisms: the Surface Area:Volume Ratio, http://www.tiem.utk.edu/~gross/bioed/bealsmodules/area_volume.html, pp. 1-4 (Year: 2000).*
Lisa at Waffle Pantry, "Size Matters", available at https://www.wafflepantry.com/blog/belgian-pearl-sugar-size/, Jan. 6, 2014 (Year: 2014).*
Recipe by GoodMorningBurger, "Liege Waffles (Belgian Pearl Sugar Waffles)", available at https://www.food.com/recipe/liege-waffles-belgian-pearl-sugar-waffles-158977#activity-feed, Mar. 8, 2006 (Year: 2006).*
Baking Bites, "What is pearl sugar?", available at https://bakingbites.com/2010/02/what-is-pearl-sugar/, Feb. 23, 2010 (Year: 2010).*
International Search Report and Written Opinion issued in application No. PCT/EP2017/000162, dated May 3, 2017 (9 pgs).

* cited by examiner

*Primary Examiner* — Jeffrey P Mornhinweg
(74) *Attorney, Agent, or Firm* — Hayes Soloway P.C.

(57) ABSTRACT

Disclosed is pearl sugar, having a biggest dimension between 5.6 and 8.0 mm, and a dissolution time at 20° C. lying between 3 minutes and 8 minutes, or a biggest dimension of smaller than 5.6, and a dissolution time at 20° C. lying between 1 minute and 3 minutes and 30 seconds. The invention further relates to a process for the preparation of pearl sugar, using a sugar-containing raw material which is brought to a moisture content lying between 0.5 and 4.0 wt. %, an average size of between 0.40 and 1.20 mm, and whereby at most 2 wt. % of particles have a size of at most 0.20 mm.

17 Claims, 2 Drawing Sheets

PEARL SUGAR; PROCESS FOR PREPARING PEARL SUGAR

BACKGROUND OF THE INVENTION

The invention relates to pearl sugar and to a process for preparing pearl sugar.

Pearl sugar is known from a.o. EP-A 0 554 231. The known pearl sugar is characterised by dissolving rather slow in water, thus having a high dissolution time.

US-A 2014/011 892 relates to a pearl sugar particle that includes granulated sugar and at least one additive, wherein the at least one additive is distributed homogeneously throughout the pearl sugar particle. A composition including a plurality of pearl sugar particles and a process for preparing a pearl sugar are also disclosed.

EP-A 2 631 304 claims manufacturing coarse sugar having a crystalline appearance. Independent claims are also included for: the coarse sugar for preparing foodstuffs; a diagram as given in the specification for producing coarse sugar, and its use, for producing product and subsequent processing; and a copy and construction of machines of the diagram or a figure as given in the specification, for establishing the above mentioned method.

FR-B 0 623 344 relates to a process for the preparation of sheets, loafs, and similar products from crystalline sugar. The crystalline sugar, which is in suitable moulds which are being centrifuged, is contacted with a saturated or supersaturated solution of white sugar having a temperature that is significantly higher than the temperature of the sugar crystals in the moulds.

It is a disadvantage of the known pearl sugar that the high dissolution time is not optimal for certain applications.

SUMMARY OF THE INVENTION

It is the objective of the present invention to reduce or even eliminate the said disadvantage.

The objective is achieved in that the pearl sugar has a dissolution time at 20° C. according to Test A lying between 3 minutes and 8 minutes.

It is an advantage of the pearl sugar according to the invention that additional ranges of applications and customer preferences can be serviced.

The invention relates to pearl sugar. Pearl sugar is as such known and also referred to as hail sugar or nib sugar, which terms are considered to be synonyms; it is an agglomerate of sugar crystals having an irregular and varying shape, whereby the biggest dimension of the said irregular shape is typically between 1 and 10 mm. The irregularity and shape variations distinguish pearl sugar from sugar cubes; furthermore, sugar cubes usually have a much higher weight compared to pearl sugar. A typical weight of a sugar cube is for example about 3 grams per cube, whereas an individual pearl sugar according to the invention preferably weighs between 0.05 and 1.0 gram, preferably between 0.1 and 0.75 gram.

In the context of the present invention the term sugar means a monosaccharide, a disaccharide, or a mixture of monosaccharides and/or disaccharides. According to the invention, the sugar used preferably is glucose, fructose, isomaltulose, tagatose, trehalulose, trehalose, sucrose or mixtures thereof; most preferably the sugar is sucrose and/or isomaltulose. Pearl sugar can, in an optional subsequent treatment, be coated, for example to provide a colour or a specific taste; furthermore, the sugar in the pearl sugar can optionally be mixed with non-sugar ingredients or additives.

Pearl sugar has numerous applications, including the use on open-faced pies as taste- and decoration feature, and the use in waffles such as for example the Liége Waffle. In waffles such as Liége waffles, pearl sugar should typically provide not only sweetness but also a certain crunch upon consumption. The use of pearl sugar in waffles illustrates that pearl sugar often must meet multiple criteria: not only should it bring sweetness, but it may also be required to bring a functionality, such as crunch, and furthermore may also be required to bring esthetical qualities. According to the invention, it was found that pearl sugar having a dissolution time between three minutes and eight minutes are highly suited to satisfy the multiple criteria of sweetness, functionality, and aesthetics as mentioned above.

According to the invention, the dissolution time of pearl sugar is determined at 20° C. according to the following test, herein designated as Test A:

i. A weighing balance is placed on a standard, such that an item such as a beaker can be placed below it. A ballast weight of about 10 grams is placed onto the balance. The balance must be equipped such that a sample to be weighed can be attached to the balance from below as well.

ii. A small sieve of about 50×50 mm in size with mesh size of about 1 mm is equipped with threads which are attached to the corners of the sieve and come together above the sieve where they connected to the balance from below, for example by means of a hook.

iii. A standard laboratory 1000 ml glass beaker having an internal diameter of about 100 mm is filled with 600 ml of demineralised water at 20° C. and placed below the balance, such that the sieve is in the water and about 4 cm below the water surface. The sieve must not touch the glass of the beaker itself.

iv. The balance is set to 0.00 grams. 20 Pearl sugars, having a biggest dimension lying between 5.6 and 8.0 mm and together weighing between 4.9 and 5.1 grams, are placed onto the sieve. This marks the beginning of the determination of the dissolution time.

v. The beaker is left undisturbed, the water is not stirred in any way.

vi. The dissolution time is the time at which the weight indication on the balance has returned to 0.0 grams.

The pearl sugar according to the invention has a dissolution time in Test A as defined herein lying between 3 and 8 minutes. It was found that a dissolution time of at least 3 minutes is instrumental in achieving a favourable balance of sweetness, functionality, and aesthetic qualities. Preferably, the dissolution time is at least 3 minutes and 30 seconds, more preferably at least 4 minutes, 4 minutes and 30 seconds, or even at least 5 minutes. It was furthermore found that the favourable balance of sweetness, functionality, and aesthetic qualities is reached if the dissolution time is at most 8 minutes; preferably the dissolution time is at most 7 minutes and 30 seconds, 7 minutes, 6 minutes and 30 seconds, or even at most 6 minutes.

The dissolution time as determined herein according to Test A requires the presence of pearl sugar having certain dimensions, as elucidated in the description of Test A above. The requirements on dimensions in the execution of Test A are an integral part of the test, because the dissolution time will be different in case the dimensions deviate significantly from those given in the description of Test A.

If verification is required to determine whether a sample of pearl sugar is according to the present invention and in case the pearl sugars available initially are outside the required dimensions on account of being too big, then the pearl sugars can simply be reduced in size, by means of for example milling, so as to meet the requirements of Test A.

If verification is required to determine whether a sample of pearl sugar is according to the present invention and in case the pearl sugars available initially are too small to meet the requirements of Test A, which is in particular the case when the peal sugars have a biggest dimension smaller than 5.6 mm, then the pearl sugars should be submitted to Test B as defined herein below. The dissolution time of a pearl sugar according to Test B is always significantly shorter than the dissolution time according to Test A of a pearl sugar which is in all aspects but size the same pearl sugar. According to an embodiment of the invention, the dissolution time according to Test B lies between 1 minute and 3 minutes and 30 seconds. Preferably, the dissolution time according to Test B is at least 1 minute and 20 seconds, 1 minute and 40 seconds, or even at least 2 minutes. Preferably, the dissolution time according to Test B is at most 3 minutes and 10 seconds, 3 minutes, 2 minutes and 50 seconds, or even at most 2 minutes and 40 seconds.

Test B is identical to Test A except for the features of step (iv); step (iv) is fully replaced with step (iv-b), defined as follows:

(iv-b) The balance is set to 0.00 grams. 5.0 grams of pearl sugars, of which at least 80 wt. % have a biggest dimension of at least 1.6 mm and of which at most 8 wt. % have a biggest dimension of 2.5 mm or more, are placed onto the sieve. This marks the beginning of the determination of the dissolution time.

In Test B, the pearl sugars to be used are significantly smaller than those used in Test A. If the pearl sugars in an available sample initially are too small to be used in Test A but still too big to be used in Test B, they should be brought into conformity of the requirements of Test B, via for example milling and/or sieving. The pearl sugars suitable for Test B satisfy the particle size-related conditions of 'P1' pearl sugar as presently supplied by Tiense Suikerraffinaderij N.V..

In a preferred embodiment of the invention, the pearl sugar has a bulk density (tapped) lying between 600 and 700 kg/m$^3$. A bulk density of at least 600, preferably at least 610 or even at least 620 or 630 kg/m$^3$, is thought to contribute to the achieving of sufficient functionality of the pearl sugar; similarly, a bulk density of at most 700 kg/m$^3$, preferably at most 690 or even at most 680 kg/m$^3$ is thought to contribute to the achieving of a sufficient functionality of the pearl sugar.

In a preferred embodiment of the invention the grain density of the pearl sugar is between 1.20 and 1.35 g/cm$^3$, more preferably between 1.25 and 1.30 g/cm$^3$.

In a preferred embodiment the pore radius, resulting from the agglomeration of the individual crystals/particles that together constitute the pearl sugar and as measured using mercury porosimetry according to DIN 66133, is at least 10 μm. More preferably, the pore radius is at least 15, 20, or even at least 25 μm. Without wishing to be bound to theory, it is thought that a sufficiently big pore radius can contribute to the interaction between a pearl sugar and the matrix in which it is embedded in certain uses—such as a dough for a waffle—and thereby help in achieving the desired functionality of the pearl sugar. In order to avoid that the interaction between pearl sugar and the matrix is too intensive, it is preferred that the pore radius is at most 70, more preferably at most 65, 60, 55, or even at most 50 or 45 μm.

The pore volume, determined according to DIN 66133, is preferably at least 120 mm$^3$/g, more preferably at least 125 or 130 mm$^3$/g. The pore volume is preferably at most 155, more preferably at most 150 mm$^3$/g.

In an embodiment of the invention, the pearl sugar has a dissolution time at 20° C. in Test A between 3 minutes and 8 minutes, consists of sucrose, has a bulk density between 600 and 700 kg/m$^3$, a grain density between 1.20 and 1.35 g/cm$^3$, a pore radius between 10 and 70 μm, a weight per individual pearl sugar of at most 1.0 gram, and a pore volume between 120 and 155 mm$^3$/g.

In a further embodiment of the invention, the pearl sugar has a dissolution time at 20° C. in Test A between 3 minutes and 8 minutes, consists of isomaltulose, has a bulk density between 600 and 700 kg/m$^3$, a grain density between 1.20 and 1.35 g/cm$^3$, a pore radius between 10 and 70 μm, a weight per individual pearl sugar of at most 1.0 gram, and a pore volume between 120 and 155 mm$^3$/g.

In a further embodiment of the invention, the pearl sugar has a dissolution time at 20° C. in Test A between 4 minutes and 7 minutes, consists of sucrose, has a bulk density between 630 and 690 kg/m$^3$, a grain density between 1.20 and 1.36 g/cm$^3$, a pore radius between 20 and 50 μm, a weight per individual pearl sugar of at most 0.75 gram, and a pore volume between 130 and 155 mm$^3$/g.

In a further embodiment of the invention, the pearl sugar has a dissolution time at 20° C. In Test A between 4 minutes and 7 minutes, consists of isomaltulose, has a bulk density between 630 and 690 kg/m$^3$, a grain density between 1.20 and 1.36 g/cm$^3$, a pore radius between 20 and 50 μm, a weight per individual pearl sugar of at most 0.75 gram, and a pore volume between 130 and 155 mm$^3$/g.

In a yet further embodiment of the invention, the pearl sugar has a biggest dimension smaller than 5.6 mm, a dissolution time at 20° C. in Test B between 1 minutes and 3 minutes and 30 seconds, consists of sucrose, has a bulk density between 600 and 700 kg/m$^3$, a grain density between 1.20 and 1.35 g/cm$^3$, a pore radius between 10 and 70 μm, a weight per individual pearl sugar of at least 0.05 gram, and a pore volume between 120 and 155 mm$^3$/g.

In a yet further embodiment of the invention, the pearl sugar has a biggest dimension smaller than 5.6 mm, a dissolution time at 20° C. In Test B between 1 minutes and 3 minutes and 30 seconds, consists of isomaltulose, has a bulk density between 600 and 700 kg/m$^3$, a grain density between 1.20 and 1.35 g/cm$^3$, a pore radius between 10 and 70 μm, a weight per individual pearl sugar of at least 0.05 gram, and a pore volume between 120 and 155 mm$^3$/g.

In an alternative embodiment of the invention, the pearl sugar consists of sucrose, has a bulk density between 600 and 700 kg/m$^3$, a grain density between 1.20 and 1.35 g/cm$^3$, a pore radius between 10 and 70 μm, a weight per individual pearl sugar of at most 1.0 gram, and a pore volume between 120 and 155 mm$^3$/g.

In a further alternative embodiment of the invention, the pearl sugar consists of isomaltulose, has a bulk density between 600 and 700 kg/m$^3$, a grain density between 1.20 and 1.35 g/cm$^3$, a pore radius between 10 and 70 μm, a weight per individual pearl sugar of at most 1.0 gram, and a pore volume between 120 and 155 mm$^3$/g.

The invention also relates to a process for the preparation of pearl sugar, preferably of the pearl sugar according to the invention. The process comprises:

a preparatory step, in which a raw material containing sugar is brought to a moisture content lying between 0.5 and 4.0 wt. %, whereby the raw material has or is brought to an average size of between 0.50 and 1.2 mm and contains or is brought to contain at most 2 wt. % of particles having a size of at most 0.20 mm;

a pressing step, wherein the raw material is pressed into intermediate shapes, herein named briquettes;

a drying step, wherein the briquettes are pre-dried;

a maturation step, wherein the pre-dried briquettes are subjected to the action of air having relative humidity between 30 and 70% and a temperature between 15 and 35° C. for a residence time of at least 12 hours, to form dried briquettes;

a breaking step, wherein the dried briquettes are milled or broken to form pearl sugar;

optionally a sieving step, wherein the pearl sugar is brought to a defined range of particle sizes.

In the preparatory step of the process of the invention, a raw material is made available. The raw material should contain sugar; in one embodiment, the raw material consists essentially of sugar or even consists of sugar. Also in the process of the invention the term sugar has the meaning as defined hereinabove. In one main embodiment the raw material consists of sugar and the sugar is sucrose and/or isomaltulose.

The raw material should take the form of particles, for example crystals. The particles, in particular the sugar particles, should have, or be brought to, an average size of between 0.40 and 1.20 mm; it was found that such particles can lead to the preparation of pearl sugar having a favourable combination of properties.

The average size of the raw material particles is defined as the 'MA' value resulting from the sieving measurement method as disclosed in ICUMSA method GS2/9-37 (2005), calculated according to the 'Rens method' as detailed in point 3 of the Appendix to ICUMSA method GS2/9-37 (2005). A non-limiting example of an often-used stack of sieves, in descending order of sieve openings, is: 1.0, 0.90, 0.80, 0.70, 0.63, 0.50, 0.40, 0.315, and 0.20 mm. Other stack composition are of course possible and indeed necessary if the particle size of the raw material requires this. Preferably, the MA of the particles, in particular the sugar particles, is at least 0.45, or even at least 0.50, 0.55, or even at least 0.60 mm. Preferably, the average size of the particles is at most 1.15, 1.10, 1.05, 1.00, 0.95, 0.90, or even at most 0.85 mm.

If the particles in the raw material are initially too big to serve as raw material in the process of the invention, they can be brought to within a range as given above by means that are as such known such as for example milling, possibly in combination with sieving.

It was found to be advantageous when the standard deviation of the average size of the raw material particles, expressed as percentage of the average size, is at most 40%. The standard deviation as meant herein is the 'CV' value as determined via the Rens method as given above. The CV is thus preferably at most 40%, more preferably at most 35, 30, 25, or even at most 20%. It was found that the functional properties of the pearl sugar can be optimised if the standard deviation of the average size of the raw material particles is kept within limits as given herein. Moreover, it was found that the properties of the briquettes, as defined hereinbelow, can be optimised in this fashion too.

It was found that the raw material should not contain a high amount of very fine particles, as a high amount of fine particles can easily lead to the preparation of pearl sugars not having a combination of properties as aimed for in the present invention. Thus, according to the invention the raw material should contain or be brought to contain at most 2 wt. % of particles having a size of at most 0.20 mm. Preferably, the raw material contains or is brought to contain at most 1.8, 1.6, 1.4, 1.2, 1.0, or even at most 0.8 or 0.6 wt,% of particles having a size of at most 0.20 mm.

It was found that the moisture content of the raw material can influence the properties of the pearl sugar produced from that raw material. As meant herein, the term moisture means water. According to the invention, the raw material in the preparatory step should contain or be brought to contain at least 0.5 wt. % moisture, as this aids in creating agglomerates in the pressing step. As meant herein, the moisture content of the raw material is the result of the 'Loss on Drying' test according to ICUMSA Method GS2/1/3-15 (2005). Preferably, the moisture content of the raw material is brought to at least 0.55, 0.60. 0.65, 0.70, 0.75, or even 0.80 wt. %. According to the invention the moisture content should be, or be brought to, at most 4.0 wt. % in order to avoid an undesirable combination of properties of the pearl sugar prepared. Preferably, the moisture content of the raw material is or is brought to at most 3.5, 3.0. 2.8, 2.6, 2.4, 2.2, 2.0, or even at most 1.8, 1.6, or 1.5 wt. %.

In a main embodiment of the invention, the moisture content limits as given for the raw material as a whole apply in particular and at least also to the sugar contained in the raw material.

According to the process of the invention, the raw material as made available in the preparatory step is subjected to a pressing step. As is known in the art, the act of pressing a sugar-containing raw material having an elevated moisture content can lead to the formation of agglomerates and thus allow the creation of defined shapes. In the pressing step, the raw material is brought into an intermediate shape. The intermediate shape is herein referred to as a briquette. The pressing step can be executed by means that are as such known, for example by means of a pair of rolling presses. The actual shape of a briquette can vary greatly: it can have a shape like a small ball or a cube, or more like a bar of soap, be sheet-like, etc.. The briquette should be significantly bigger than the typical size of the pearl sugars which will in a later step be formed from it. Thus, a briquette preferably weighs at least 3 grams, more preferably at least 4, 5, 6, 7, 8, 9, or even at least 10 grams. For practical reasons, a briquette will normally not weigh more than 1 kg, preferably not more than 750, 500, 400, 300, 200, or even at most 100, 75, or 50 grams. A preferred example of how a briquette can be shaped is given in FIG. 3.

The actual pressure to which the raw material is subjected in the pressing step can vary within wide ranges and is moreover dependent on the shape of the briquette and the type of press used. The person skilled in the art will however without difficulty be able to determine the correct pressure by evaluating the properties of the resulting briquettes. In this regard, it is noted that when the pressure is too high, then this will lead to an undesirable rise in the percentage of breakage of the sugar crystals, which was found to express itself a.o. in an increase of the dissolution time of the pearl sugar prepared from these briquettes. A too-high pressure can thus lead to the preparation of pearl sugars that are no longer according to the invention. It is in this regard further noted that when the pressure is not sufficiently high, the briquettes will not have sufficient coherence and will tend to fall apart in the subsequent process steps. Moreover, any pearl sugar so produced will run the risk of having a too-low dissolution time and thus be no longer a pearl sugar according to the invention.

The forming of the briquettes can, depending on the specific technology used, bring with it that some of the raw material that was introduced into the pressing step fails to be converted into a briquette and is separated off from the briquettes as a side stream. In a preferred embodiment of the invention, a recirculation step is done in which at least a portion of the side stream is used again in the preparatory step. This is preferably done by mixing the said portion of the side stream during the preparatory step with the raw material, whereby a feeding mixture is formed. The feeding mixture has, or is brought to, a moisture lying between 0.5 and 4.0 wt. %. In the subsequent pressing step, the feeding mixture—instead of the raw material—is pressed into briquettes.

The amount of material from the side stream that is subjected to the recirculation step can vary between wide limits; however, it is preferred that the side stream at no time fully replaces the raw material. Preferably the weight ratio in the feeding mixture between the material from the side stream and the raw material is between 75:25 and 1:99, more preferably between 50:50 and 10:90.

Upon being formed, the briquettes are subjected to a drying step. In one preferred embodiment, the drying step is executed immediately following the pressing step. In the drying step, the moisture content of the briquettes is reduced, however not yet to the concentration which is ultimately desirable and typical for pearl sugar; thus, the drying executed in the drying step is referred to as a pre-drying. In the drying step, the moisture content of the briquettes is reduced, and preferably brought to a level of between 0.2 and 0.8 wt. %, thereby forming pre-dried briquettes. The drying step can be executed by means that are as such known. In one embodiment, the drying step is executed in an infrared drying oven. In an alternative embodiment, the drying step is executed in a microwave oven. A combination of infrared drying and microwave drying is also possible according to the invention.

In an optional embodiment of the invention, the pre-dried briquettes are not immediately subjected to the maturation step described below, but are first allowed, in a relaxation step, to rest at about room temperature, preferably between 15° C. and 30° C., and preferably at a relative humidity of at most 80% for a relaxation time. The relaxation time is preferably between 5 and 60 minutes. Preferably, the moisture content in the briquettes is reduced during the relaxation step; the reduction is preferably between 0.1 and 0.5 wt. %. It was found that the said reduction in moisture content can be typically achieved by exposing the briquettes to ambient air or an ambient air flow. The advantage of executing the relaxation step is that it was found that the pre-dried briquettes increase in hardness and can thus be better handled afterwards.

According to the invention, the pre-dried briquettes, having optionally undergone the relaxation step, are treated in a maturation step. In the maturation step, the pre-dried briquettes are exposed to the reaction of air having a relative humidity of preferably between 30 and 70% at a temperature of preferably between 15 and 35° C. for a duration of preferably between 2 hours and 96 hours, to form dried briquettes. Such a maturation step is as such known, and is in practice often executed in a silo. The objectives of the maturation step are to reduce moisture content of the briquettes and to increase the hardness of the briquettes. The moisture content is reduced to preferably at most 0.2 wt. %, more preferably at most 0.1 wt. %. The hardness is increased. Within the context of the present invention, hardness is measured with a Tablet Tester 8M of Pharmatron—Dr. Schleuniger; the result is expressed in Newton (N). As a result of maturation, the hardness is increased to preferably between 150 and 350 N, more preferably to between 175 and 300 N, most preferably to between 200 and 250 N.

According to the invention, the dried briquettes are subjected to a breaking step. The breaking step can be executed by means that are as such known such as for example by crushing the briquettes between two rotating rolls or in a lump breaker. The briquettes, upon being broken, will come apart into smaller, irregular shapes, being the pearl sugar according to the invention.

In an optional embodiment of the invention, the pearl sugar as formed in the breaking step is subjected to a sieving step, in which the pearl sugar is brought to a defined range of particle sizes. Such as sieving step is as such known.

The pearl sugar as produced in the process according to the invention can be a pearl sugar having a composition, size, dissolution time according to test A or test B, bulk density, grain density, pore radius, or pore volume according to any of the embodiments of the invention described hereinabove.

BRIEF DESCRIPTION OF THE DRAWINGS

In the figures.

DETAILED DESCRIPTION OF THE INVENTION

The invention will be illustrated by means of the following Examples and Comparative Experiments, without being limited to it.

Example 1

Figure 1:
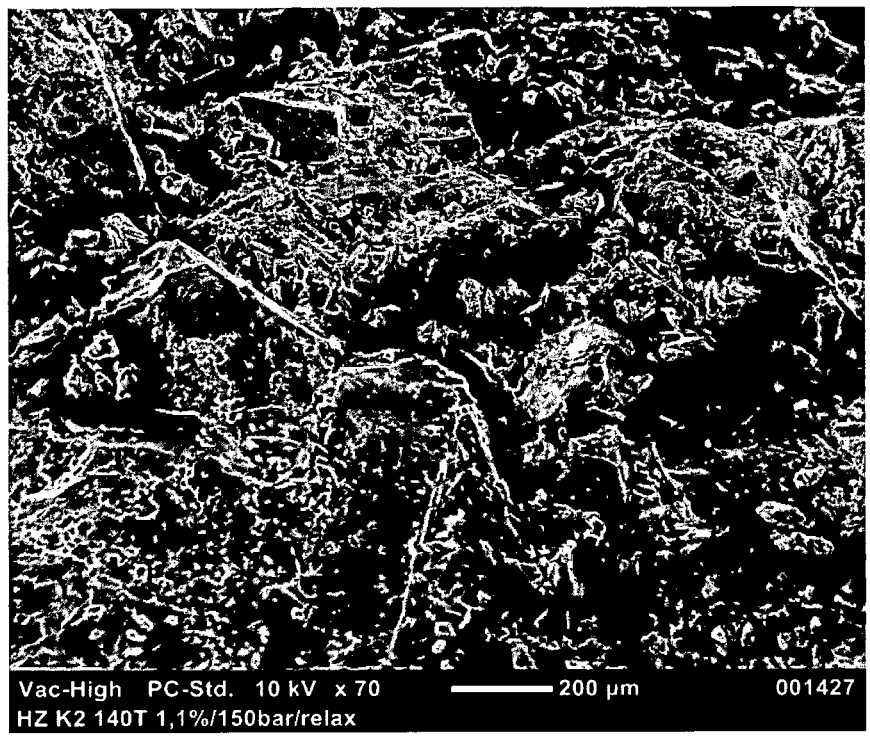
FIG. 1 shows an scanning electron microscope (SEM) picture of a section of a pearl sugar according to the invention.
Figure 2:
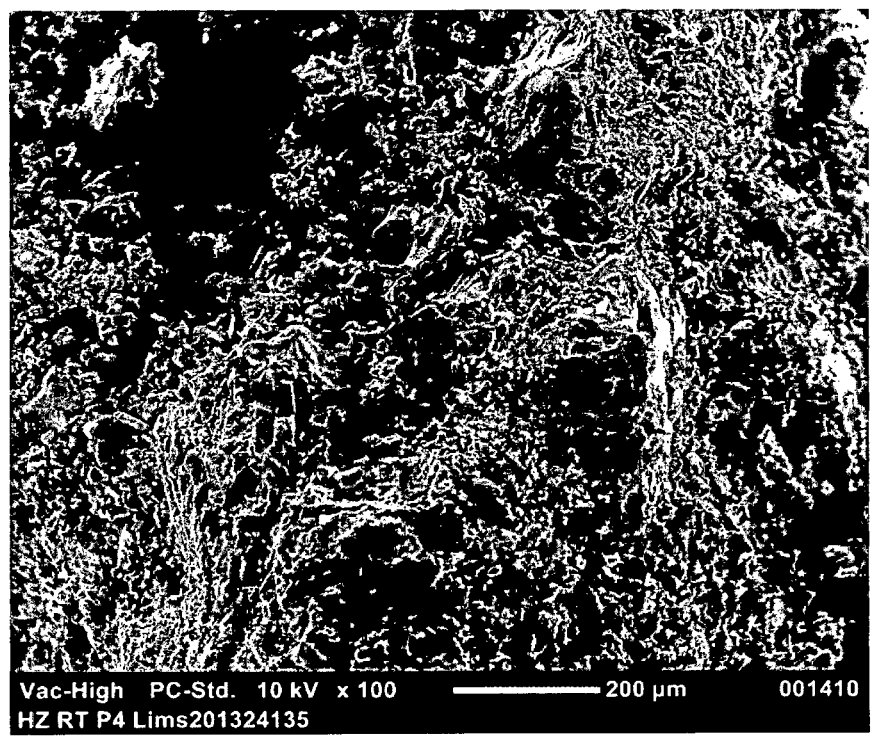
FIG. 2 shows a SEM picture of a section of a known pearl sugar, namely pearl sugar type P4 (supplier: Tiense Suikerraffinaderij NV); compared to the pearl sugar of the invention, the known pearl sugar shows a significant higher degree of very fine particles and also significantly more breakdown of the main crystal structures.
Figure 3:
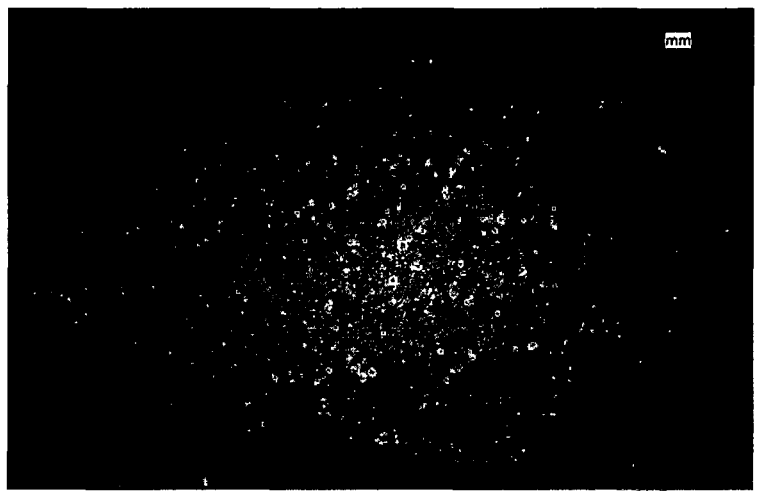
FIG. 3 shows a briquette according to the invention.

A raw material consisting of sucrose having an MA of 0.67 mm, a CV of 29%, 0.3 wt. % of particles of at most 0.20 mm, and 0.03 wt. % moisture was brought to a moisture content of 1.2 wt. %. The raw material was pressed in a roll press to briquettes having an average weight of 13.5 grams. The briquettes were pre-dried in a microwave oven to a moisture content of 0.6 wt. %, immediately after which they were left—in a relaxation step—in ambient air and at room temperature for about 20 minutes, leading to a further reduction of the moisture content to 0.35 wt. %. At that point, the hardness of the briquettes was on average 90 N. The pre-dried briquettes were now subjected to the maturation step, in which the briquettes were exposed to air of 25° C. and having a relative humidity of 50% during 7 days, after which the moisture content of the dried briquettes was 0.05 wt. % and their hardness was 225 N. The dried briquettes (see FIG. 3) were then subjected to a breaking step in a lump breaker, whereby pearl sugar was formed. The pearl sugar had a dissolution time in Test A of 5 minutes and 45 seconds, a pore radius of 28 μm, a pore volume of 149 mm$^3$/g, a bulk density of 670 kg/m$^3$, and a grain density of 1.27 g/cm$^3$. A SEM-picture of part of one individual pearl sugar is shown in FIG. 1.

Comparative Experiment A

Measurements were done on commercially available pearl sugar of type P4 (Tiense Suikerraffinaderij). The known pearl sugar had a dissolution time in Test A of 10 minutes and 30 seconds, a pore volume of 104 mm³/g, a pore radius of 7 µm, a bulk density of 730 kg/m³, and a grain density of 1.36 g/cm³.

A measurement was furthermore done on a dried briquette, made not according to the invention and leading to the known P4-type of pearl sugar. The known briquette had a hardness of 413 N.

From Example 1 and Comparative Experiment A it follows that the pearl sugar according to the invention exhibits significantly different properties as compared to the known pearl sugar.

Example 2

The pearl sugar as prepared in Example 1 was sieved to the size specifications of pearl sugar type P4 (Tiense Suikerraffinaderij), i.e.: at least 70 wt. % is between 5.6 mm and 8 mm, at most 20 wt. % is smaller than 5.6 mm, and at most 15 wt. % is bigger than 8 mm. This portion was used to prepare Liége Waffels. The following ingredients were used:

| Ingredient | Amount |
| --- | --- |
| Pastry flour | 750 g |
| Milk (lukewarm) | 270 ml |
| Fresh yeast | 70 g |
| Eggs | 3 |
| Egg yolks | 2 |
| Vanilla sugar | 4 g |
| Butter | 400 g |
| Pearl sugar | 500 g |
| Salt | a pinch of salt |

All ingredients except for the butter and the pearl sugar were mixed together to form a dough. The dough was left to rest for 30 minutes. The butter and pearl sugar were then kneaded into the dough: first the butter, then the pearl sugar. The dough was divided into portions of about 100 grams; these portions were left to rest for 15 minutes, after which waffles were baked in a standard electrical waffle iron. The baking time was three minutes.

The waffles were evaluated by slicing them in two (along the plane surface) and determining how many of the pearl sugars were hard or soft. A pearl sugar in a Liége waffle was considered 'hard' when it exhibited a brittle-crunchy behaviour when probed with a toothpick and only a very small degree of melting. A pearl sugar in a Liége waffle was considered 'soft' when it had melted somewhat but still showed some crunchy behaviour.

Of the pearl sugars in the waffles, 41% was considered to be hard, while 59% was considered to be soft. No pearls had melted away completely.

Comparative Experiment B

Liége waffles were prepared according to the method as described in Example 2, with however the difference that the pearl sugar used was not pearl sugar according to the invention but was pearl sugar type P4 (supplier-Tiense Suikerraffinaderlj). Upon evaluation of the waffles, 60% of the pearls sugars were considered to be hard, while 40% were considered to be soft. No pearls had melted away completely.

From Example 2 and Comparative Experiment B it follows that the pearl sugar according to the invention can exhibit a significantly different behaviour in use as compared to the known pearl sugar.

Example 3

During preparation of the pearl sugar as given in Example 1, the breaking step led also to a fraction 'S' of pearl sugar having smaller dimensions. The 'S' fraction pearl sugar met the size requirements of the P1 pearl sugar product from Tiense Suikerraffinaderij NV, and was thus suitable as such for Test B. Fraction 'S' was submitted to Test B. The resulting dissolution time was 2 minutes and 23 seconds.

The invention claimed is:

1. A pearl sugar, comprising an agglomerate of sugar crystals of a monosaccharide, a disaccharide or a mixture of a monosaccharide and a disaccharide selected from the group consisting of glucose, fructose, isomaltulose, tagatose, trehalulose, trehalose and sucrose, and mixtures thereof, wherein the agglomerate has an irregular shape having a maximum linear dimension of between 5.6 and 8.0 mm, and bulk density of between 600 and 700 kg/m³ wherein the agglomerate further has a pore radius of at least 10 µm and at most 70 µm, a grain density of between 1.20 and 1.35 g/cm³, and a dissolution time in demineralized water at 20° C. of between 3 minutes and 8 minutes and exhibits improved crunch when used in a baked food product.

2. A pearl sugar comprising an agglomerate of sugar crystals of a monosaccharide, a disaccharide, or a mixture of a monosaccharide and a disaccharide selected from the group consisting of glucose, fructose, isomaltulose, tagatose, trehalulose, trehalose and sucrose, and mixtures thereof, wherein the maximum linear size is smaller than 5.6 mm, wherein the agglomerate has a bulk density of between 600 and 700 kg/m³, wherein the agglomerate further has a pore radius of at least 10 µm and at most 70 µm, a grain density of between 1.20 and 1.35 g/cm³, and a dissolution time in demineralized water at 20° C., of between 1 minute and 3 minutes and 30 seconds and exhibits improved crunch when used in a baked food product.

3. The pearl sugar as claimed in claim 1, wherein the sugar in the sugar crystals consists essentially of crystals of sucrose and/or isomaltulose.

4. The pearl sugar as claimed in claim 1, having a pore volume of between 120 mm³/g and 155 mm³/g.

5. A process for the preparation of a pearl sugar comprising an agglomerate of pearl sugar crystals useful for providing improved crunch to a baked food product comprising the steps of:

(A) a preparatory step, in which a raw material containing crystals of a monosaccharide, a disaccharide or a mixture of a monosaccharide and a disaccharide selected from the group consisting of glucose, fructose, isomaltulose, tagatose, trehalulose, trehalose and sucrose, and mixtures thereof is brought to a moisture content between 0.5 and 4.0 wt. %, whereby the raw material has an average crystal size dimension of between 0.40 and 1.20 mm and contains at most 2 wt. % of crystal particles having a crystal size of at most 0.20 mm;

(B) a pressing step, wherein the raw material from step (A) is pressed into briquettes;

(C) a drying step, wherein the briquettes of step (B) are dried;

(D) a maturation step, wherein the dried briquettes from step (C) are subjected to the action of air having relative humidity between 30 and 70% and a temperature between 15 and 35° C. for a residence time of at least 12 hours; and (E) a breaking step, wherein the briquettes from step (D) are milled or broken to form particles of agglomerates of said sugar crystals having an irregular shape having a maximum linear dimension of between 5.6 and 8.0 mm and a bulk density of between 600 and 700 kg/m³, and wherein each agglomerate has a pore radius of at least 10 μm and at most 70 μm, a grain density of between 1.20 and 1.35 g/cm³, and a dissolution time in demineralized water at 20° C., of between 3 minutes and 8 minutes, and exhibits crunch; and (F) optionally a sieving step, wherein the agglomerates of pearl sugar crystals from step (E) is brought to a defined range of agglomerate particle sizes.

6. The process according to claim 5, wherein the raw material consists essentially of sucrose and/or isomaltulose.

7. The process according to claim 5 wherein the standard deviation of an average size of the agglomerate particles, expressed as percentage of the average size, is at most 40%.

8. The process according to claim 5, wherein in the preparatory step (A) the raw material is brought to a moisture content between 0.8 and 1.6 wt. %.

9. The process according to claim 5, further comprising a recirculation step (B1) wherein a portion of a side stream, comprising raw material which was not converted into briquettes during the pressing step (B), is used again in the preparatory step (A) by mixing the portion of the side stream with fresh raw material to form a feeding mixture, whereby in the pressing step (B) the feeding mixture is pressed into briquettes.

10. The process according to claim 5, wherein the drying step (C) is executed in an infrared oven or in a microwave oven.

11. The process according to claim 5, wherein the preparatory step (A), the pressing step (B), the drying step (C), and the maturation step (D) are executed such that the resulting briquettes have a hardness between 150 N and 350 N.

12. The process according to claim 5, wherein the maturation step (D) is executed with air having a relative humidity between 40 and 60% and a temperature between 20 and 30° C.

13. The agglomerate of pearl sugar crystals as claimed in claim 2, wherein the sugar in the pearl sugar crystals consists essentially of sucrose and/or isomaltulose.

14. The agglomerate of pearl sugar crystals as claimed in claim 2, having a bulk density lying between 620 and 680 kg/m³.

15. The agglomerate of pearl sugar crystals as claimed in claim 2, having a pore radius of 10 μm.

16. The agglomerate of pearl sugar crystals as claimed in claim 2, having a pore volume of between 120 mm³/g and 155 mm³/g.

17. A process for the preparation of an agglomerate of pearl sugar crystals formed by the steps of:

(A) a preparatory step, in which a raw material containing crystals of a monosaccharide and a disaccharide selected from the group consisting of glucose, fructose, isomaltulose, tagatose, trehalulose, trehalose and sucrose, and mixtures thereof is brought to a moisture content between 0.5 and 4.0 wt. %, whereby the raw material has an average crystal size dimension of between 0.40 and 1.20 mm and contains at most 2 wt. % of crystal particles having a crystal size of at most 0.20 mm;

(B) a pressing step, wherein the raw material is pressed into briquettes;

(C) a drying step, wherein the briquettes are pre-dried;

(D) a maturation step, wherein the pre-dried briquettes are subjected to the action of air having relative humidity between 30 and 70% and a temperature between 15 and 35° C. for a residence time of at least 12 hours; and (E) a breaking step, wherein the dried briquettes are milled or broken to form particles of agglomerates of pearl sugar crystals having an irregular shape having a maximum linear dimension, wherein the maximum linear dimension is smaller than 5.6, and wherein each agglomerate has a pore radius of at least 10 μm and at most 70 μm, a grain density of between 1.20 and 1.35 g/cm³, and a bulk density of between 600 and 700 kg/m³, and a dissolution time in demineralized water at 20° C. of between 1 minute and 3 minutes 30 seconds, and exhibits crunch; and (F) optionally a sieving step, wherein the agglomerates of pearl sugar crystals from step (E) is brought to a defined range of agglomerate particle sizes.

\* \* \* \* \*